United States Patent
Hummel

(10) Patent No.: US 10,530,672 B2
(45) Date of Patent: Jan. 7, 2020

(54) RE-REGISTRATION OF FILL LEVEL MEASUREMENT DEVICES IN A WEB PORTAL

(71) Applicant: VEGA GRIESHABER KG, Wolfach (DE)

(72) Inventor: Jakob Hummel, Elzach (DE)

(73) Assignee: VEGA GRIESHABER KG, Wolfach (DE)

( * ) Notice: Subject to any disclaimer, the term of this patent is extended or adjusted under 35 U.S.C. 154(b) by 269 days.

(21) Appl. No.: 15/454,566

(22) Filed: Mar. 9, 2017

(65) Prior Publication Data
US 2017/0264508 A1    Sep. 14, 2017

(30) Foreign Application Priority Data

Mar. 9, 2016 (EP) ..................................... 16159454

(51) Int. Cl.
| | | |
|---|---|---|
| *H04L 12/26* | (2006.01) | |
| *H04L 29/08* | (2006.01) | |
| *H04L 29/06* | (2006.01) | |
| *H04W 88/02* | (2009.01) | |

(52) U.S. Cl.
CPC ............ *H04L 43/04* (2013.01); *H04L 67/303* (2013.01); *H04L 67/42* (2013.01); *H04W 88/02* (2013.01)

(58) Field of Classification Search
CPC ....... H04L 43/04; H04L 67/12; H04L 67/303; H04L 67/42; G01D 4/002; H04W 88/02; Y02B 90/241; Y04S 20/32
See application file for complete search history.

(56) References Cited

U.S. PATENT DOCUMENTS

| | | | |
|---|---|---|---|
| 8,351,680 B2 | 1/2013 | Kalteis | |
| 9,608,878 B2 | 3/2017 | Hoferlin et al. | |
| 10,091,015 B2 * | 10/2018 | Kennedy | H04L 12/2814 |
| 2014/0244834 A1 * | 8/2014 | Guedalia | H04L 67/16 |
| | | | 709/224 |

(Continued)

FOREIGN PATENT DOCUMENTS

| | | |
|---|---|---|
| CN | 103376129 A | 10/2013 |
| DE | 101 42 854 A1 | 5/2002 |

(Continued)

OTHER PUBLICATIONS

Combined Chinese Office Action and Search Report dated May 7, 2019 in corresponding Chinese Patent Application No. 201710012686.X (with English Translation of Category of Cited Documents); citing document AO therein, 7 pages.

*Primary Examiner* — Todd L Barker
(74) *Attorney, Agent, or Firm* — Oblon, McClelland, Maier & Neustadt, L.L.P.

(57) ABSTRACT

There is provided a measuring system for acquiring measured values for fill level, measured values for pressure, measured values for flow, or measured values for density, the system including a central server and a plurality of measurement devices, which are connected to the server via the internet. A mobile device is also provided, which receives identification numbers of the measurement devices and transmits the identification numbers to the server, whereupon the server transmits the corresponding measurement data to the mobile device. As a result, it is possible to facilitate the assignment of measurement sites to a customer in a web portal.

10 Claims, 2 Drawing Sheets

(56) References Cited

U.S. PATENT DOCUMENTS

2015/0074179 A1 3/2015 Graw
2015/0111539 A1 4/2015 Shim
2018/0324170 A1* 11/2018 Chen ...................... G06F 21/33

FOREIGN PATENT DOCUMENTS

| DE | 10 2006 051 014 A1 | 4/2008 |
| DE | 10 2012 108 990 A1 | 5/2014 |
| EP | 2 849 142 A1 | 3/2015 |
| EP | 2 901105 A1 | 8/2015 |
| WO | WO 2013/131546 A1 | 9/2013 |

* cited by examiner

RE-REGISTRATION OF FILL LEVEL MEASUREMENT DEVICES IN A WEB PORTAL

CROSS-REFERENCE TO RELATED APPLICATIONS

This application claims the benefit of the filing date of European Patent Application No. 16 159 454.4 filed on 9 Mar. 2016, the entire content of which is incorporated herein by reference.

FIELD

The invention relates to fill level, pressure, and flow measuring systems. The invention relates in particular to a mobile device for registering a fill level measurement device, pressure measurement device, or flow measurement device in a central server of a measuring system, to a measuring system comprising a mobile device of this kind, to a method for acquiring measured values for fill level, measured values for pressure, or measured values for flow in a measuring system, for registering a measurement device in the measuring system and for retrieving measurement data by means of the mobile device in the central server, to a program element and to a computer-readable medium.

BACKGROUND

Measured values of fill level measurement devices, flow measurement devices, and pressure measurement devices can be transmitted to a mobile device or mobile terminal in a wired or wireless manner if the measurement device can be unequivocally assigned to the mobile device. If the measured values are intended to be transmitted (indirectly) via a central server, it is important to ensure that the user or the mobile device actually has appropriate authorisation. This can be done on the server side by the operator giving the mobile device access to the server in order to retrieve these data.

SUMMARY

A first aspect of the invention relates to a mobile device or terminal for registering, for the first time, or re-registering a measurement device in a measuring system, and optionally for retrieving fill-level measurement data, pressure measurement data and/or flow measurement data of the measurement device in a central server (by means of the mobile device).

A communication module is provided, which is used to transmit an identification number (which can be transmitted from the measurement device by radio, optically using a camera (e.g., QR code or OCR-recognition of a serial number), using a GPS sensor or by infrared) and dial into the central server. The radio communication link to the measurement device is, for example, a short-range radio communication link, such as a WLAN or Bluetooth link. The measurement device can, in particular, be a fill level measurement device, a pressure measurement device or a flow measurement device. Dialling into the central server may take place via the Internet.

The mobile device also comprises a processor, which is programmed and designed to instruct the mobile terminal to log into the central server via the Internet and to receive or accept an identification number from the measurement device. This identification number can be retrieved, for example, in the measurement device or broadcasted by the measurement device at regular intervals. If the distance between the user and the measurement device is short enough, the user's mobile device can receive this identification number. The processor can then transmit the identification number (and optionally other data) to the central server via the Internet in order to assign the measurement device to the customer (i.e., the user of the mobile device) and transmit the measurement data of the measurement device to the mobile device.

In an embodiment, this may all take place in a fully automatic manner. Therefore, if the distance between the user and the measurement device is short enough, the user's mobile device receives the identification number and subsequently transmits said identification number to the central server via the Internet, which server then transmits the measurement data (for example the current fill level) to the mobile device via the Internet.

To begin, the anonymous data from the measurement site are assigned to a customer. These data are for example data that are specific to the measurement device and are issued ex-works, e.g., the serial number or identification number, device name, calibration data, firmware version, or device assembly. The customer (account) data are stored in the mobile device and the identification number of the measurement site (or the measurement device) is combined in the mobile device and automatically transmitted to the server, e.g., by radio, and assigned. In this case, additional information can be linked thereto. This additional data include, e.g., information relating to location (GPS data) or additional information relating to the measurement site, such as comments input by the user.

The server may verify whether the identification number of the measurement device transmitted to said server from the mobile device actually relates to a measurement device which is to be assigned to the customer (or the customer's mobile device). If this is not the case, no measurement data are transmitted to the mobile device. However, the measurement data may be transmitted to the terminal anyway, i.e., without there being any verification.

It may also be provided that the only identification number to be transmitted to the server is the identification number that has not yet been transmitted to the server or relates to a measurement device that is not yet registered in the server for the mobile terminal. This may reduce the data traffic between the mobile device and the server.

Therefore, if, for example, a customer moves through a building in which a plurality of measurement devices are installed, depending on the distance from the corresponding measurement devices, the customer will receive one or more identification numbers, and the mobile device will check which identification number is new, i.e., which measurement device is not yet registered. This new number is then transmitted to the server and the server sends the corresponding measurement data to the mobile device.

In addition to the identification number, the mobile device may also transmit its current position (location) to the central server via the Internet. For this purpose, the mobile device comprises a position determination unit, for example, which determines the position of the mobile device. This determination can be triggered once the mobile device has received an identification number from the measurement device.

According to another embodiment, in the case mentioned above, the mobile device retrieves user account information from an internal data memory, which user account information makes it possible to log the user (or the mobile device) into the central server, should be clearly assigned to the user and identifies said user. This user account information can be transmitted, together with the identification number and optionally together with the position data of the mobile device, to the central server via the Internet in order to assign the measurement device to the customer and transmit the measurement data of the measurement device to the mobile device.

Measurement data are only transmitted from the server to the mobile device if the customer (or the mobile terminal) is actually also logged into the server.

According to an embodiment, the processor is designed to instruct the mobile device to send a request signal to the measurement device and to receive or accept the identification number of the measurement device as the response to the request signal.

In this case, the transmission of the identification number from the measurement device to the mobile device is thus triggered by the mobile device. The identification number may also arrive at the mobile device in another way, e.g., by a barcode or a QR code being scanned by the mobile terminal, which barcode or QR code is located on the measurement device or on the apparatus in which the measurement device takes its measurement. This apparatus may be a tank or a pipe, for example.

The position can be determined using GPS, for example, but also by means of mobile communication antennae or by identifying the nearest WLAN transmitter.

The user can be identified in the server by transmitting account information (e.g., user name and password), but also by means of a one-off identification token. Token identification may also take place retrospectively. A token can be used as an alternative to the account. The connection may be established, e.g., in the following steps:

1. The mobile device connects to a security server.
2. The security server sends a token to the mobile device, using a standardized/secure open protocol such as OAuth.
3. The mobile device or the measurement device sends the device identification together with the token to the central measurement data server.

By means of the token, it is possible to identify who sent the information.

User identification may also be initiated by the central server or the evaluation unit of the measurement device.

In particular, the mobile device may comprise a user interface for triggering the transmission of the identification number to the central server. For example, the mobile device receives the identification number from the measurement device and the user can then decide whether this identification number is actually transmitted to the server in order to cause measured data to be transmitted from the server to the mobile device.

Before entering the building for example, the user may also decide, using the interface, which measurement devices are of interest, i.e., which identification numbers could actually be sent to the server. This can be advantageous if there is a large number of measurement devices in the building, but the user would only like to receive the measurement data retrieved by or transmitted from very specific measurement devices.

An embodiment also relates to a measuring system for acquiring measured values for fill level, measured values for pressure, or measured values for flow, comprising one or more mobile devices of the kind described above and in the following. The measuring system also comprises at least one measurement device, which is a fill level measurement device, a pressure measurement device, or a flow measurement device. A central server is also provided, which can carry out the server-side method steps described in the following.

For example, the central server is designed to check whether the identification number transmitted from the mobile device relates to a measurement device that is to be unequivocally assigned to the customer. The server can be designed to transmit the measured value of this measurement device to the mobile device only if the check result is positive, i.e., when there is unequivocal assignment. If this is not the case, no measured value is transmitted.

An embodiment also relates to a method for acquiring measured values for fill level, measured values for pressure or measured values for flow in a measuring system, for re-registering a measurement device in the measuring system, and for retrieving fill-level measurement data, pressure measurement data, and/or flow measurement data of the measurement device in a central server.

The mobile device is first logged into the central server via the Internet. Before, during, or after this, a measurement device identification number is transmitted from the measurement device to the mobile device. This transmission can be triggered by the mobile device or by broadcasting.

The identification number is then transmitted from the mobile device to the central server via the Internet and the server assigns the measurement device to the mobile device, whereupon said server transmits measurement data of the measurement device to the mobile device.

An embodiment also relates to a program element which, when executed on a processor of a mobile device, prompts the mobile device to log into the central server via the Internet, receive or accept an identification number of a measurement device from the measurement device, and then receive and optionally display measurement data of the measurement device from the central server.

An embodiment also relates to a computer-readable medium, on which a program element of the above type is stored.

The program element may be part of a piece of software, which is stored on the processor of the mobile device. The program element may also be a program, which by an update prompts an existing program element to use the disclosed device, system, and/or method.

The illustrations in these drawings are schematic and not to scale. Embodiments are described below with reference to these drawings.

DETAILED DESCRIPTION OF EMBODIMENTS

Figure 1:
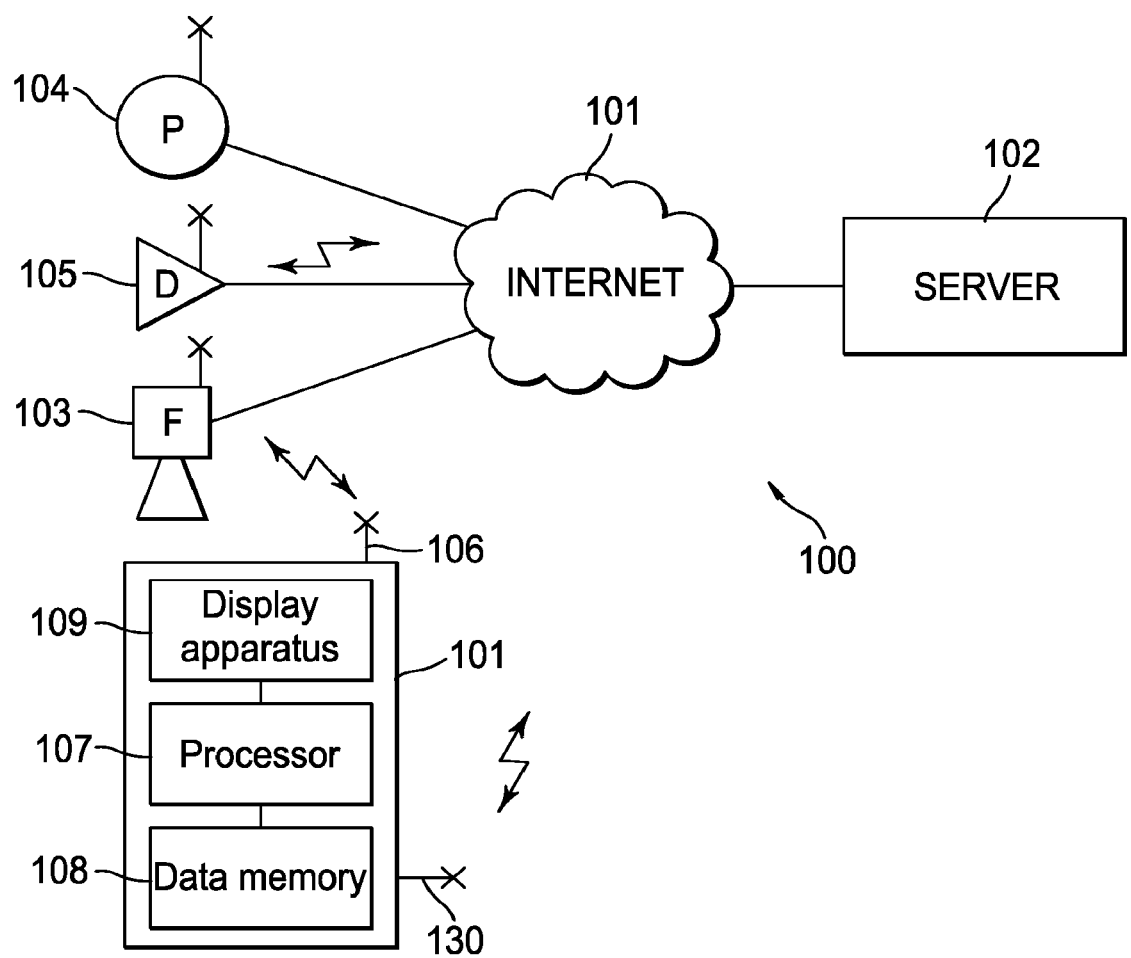
FIG. 1 shows a measuring system according to an embodiment.

FIG. 1 shows a measuring system 100, which comprises a mobile device or mobile terminal 101, a central server 102, e.g., in the form of a VEGA Inventory System, and a plurality of measurement devices 103, 104, and 105.

The measurement devices are, for example, one or more fill level measurement devices 103, one or more flow measurement devices 105, and one or more pressure measurement devices 104.

The measurement devices comprise a communication apparatus for radio communication with the mobile terminal 101. This involves, for example, a close-range communication link, such as a WLAN, Bluetooth, or RFID link. In the case of RFID, a corresponding RFID chip can be attached to the container of which the fill level is being measured by the measurement device or be attached to the measurement device itself. Furthermore, the measurement devices 103, 104, and 105 are connected to the Internet 110. This connection can be wired and/or wireless. The server 102 is also connected to the Internet, as is the mobile terminal 101. In particular, dialling into the central server can take place via the Internet. For this purpose, the mobile terminal may comprise a separate antenna 130.

The mobile terminal may be a smart phone, a tablet, or a mobile computer, for example. The mobile terminal 101 comprises a display apparatus 109, a communication module 106, a processor 107, and a data memory 108. The processor can access the data memory 108, transmit display data to the display apparatus 109, and receive or accept the data received by the communication module 106 or transmit to the communication module 106 data to be sent.

The measurement devices can comprise corresponding evaluation units, which transmit the measurement data (e.g., fill-level data, pressure data, flow data) via the Internet to the central server 102, which is, for example, in the form of what is referred to as a VEGA Inventory System.

In order to make the measurement sites of an evaluation unit of this kind visible in the Web portal, the mobile terminal 101 transmits the serial number of the corresponding measurement device to the server, which then links the measurement device to the mobile terminal and assigns the two devices to one another.

For example, an "app" can be stored on the mobile terminal that allows the user to log into the central server. If the user does log in, the mobile terminal 101 uses its communication module, e.g., a Bluetooth module or a WLAN module, to receive the serial number of the measurement device or evaluation unit. At the same time, the mobile terminal determines its current position, using GPS for example. The user account information, the received serial number of the measurement device, and optionally the position of the mobile terminal is then transmitted to the server and assigned to the customer in the server. The customer can then directly see the measurement data and optionally also additional sensor data of the corresponding measurement device.

The display of the measurement data on the mobile terminal may, for example, include information relating to the position of the measurement device. For example, a location plan may be displayed that shows the different positions of the measurement devices or storage tank, and the measurement data (for example, the fill level data) can be displayed directly on the corresponding tank. This makes it easier to assign the measurement data to the corresponding measurement site (in this case, a storage tank).

It may also be provided that the only measurement data to be displayed is the data that come from the measurement device to which the customer is in direct proximity, i.e., the device that is nearest to the customer. The decision as to which measurement device is nearest to the mobile terminal can be made by the mobile terminal, for example, by comparing the signal strengths of the signals by means of which the measurement devices transmit their identification numbers to the mobile terminal. Alternatively or additionally, the mobile terminal may comprise a digital map on which the positions of the corresponding measurement devices are recorded, and therefore the mobile terminal can assign an identification number to a measurement device location and then decide which measurement device is nearest to the mobile terminal by comparing the measurement device location with the measured location of the terminal itself. These data are then displayed.

Figure 2:
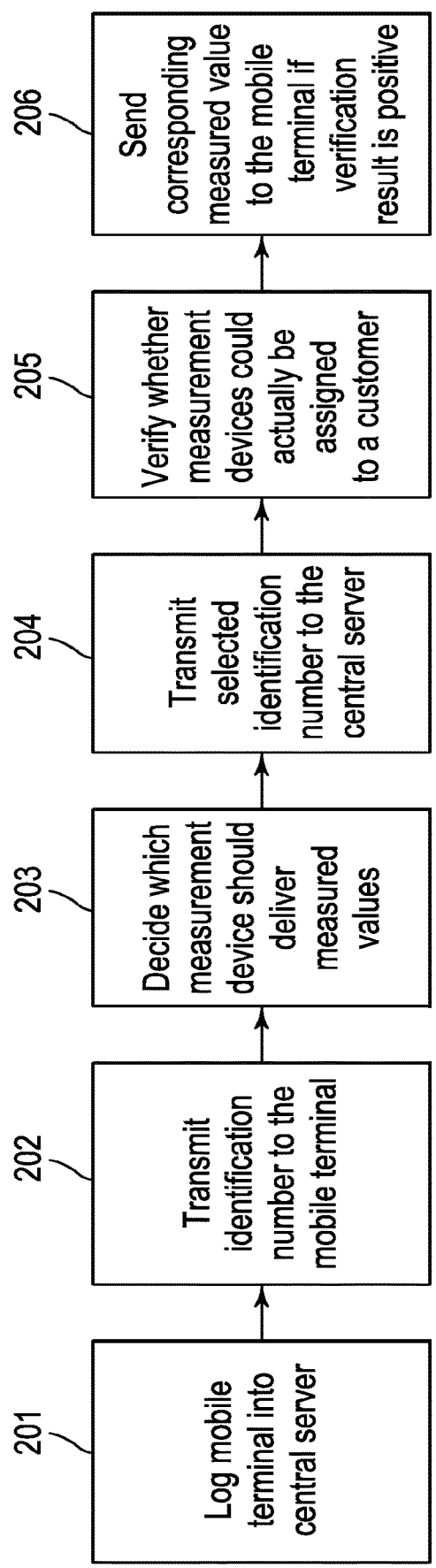
FIG. 2 is a flow diagram of a method according to an embodiment.

FIG. 2 is a flow diagram of a method in which, in step 201, the mobile terminal is logged into the central server. The central server is then aware of which user is involved and optionally also which measurement devices are to be assigned to this user. In step 202, a plurality of identification numbers of a plurality of measurement devices are transmitted to the mobile terminal. In step 203, the user of the mobile terminal decides which identification numbers, i.e., which measurement devices, should deliver measured values. The selected identification numbers are then transmitted, in step 204, to the central server, which optionally provides verification, in step 205, as to whether these measurement devices could actually be assigned to the customer. In step 206, the server sends the corresponding measured values desired by the customer to the mobile terminal, if the verification result is positive.

The customer is thus logged into the VEGA Inventory System by the customer's account on their smartphone/tablet/mobile computer by means of an app. The customer uses their Bluetooth or WLAN module to receive the serial number of the measurement device. At the same time, the position of the customer is determined using GPS. Account information, the serial number, and optionally the position are transmitted to the server and assigned to the customer. The customer can then directly see their sensor data.

In addition, the terms "having" and "comprising" do not exclude any other elements or steps, and the indefinite article "a" or "an" does not rule out a plurality. Features or steps described with reference to one or more embodiments may also be used in combination with other features or steps of one or more of the other above-described embodiments.

I claim:

1. A mobile device for registering a measurement device in a measuring system, comprising:
   communication circuitry configured to transmit an identification number of the measurement device being a fill level measurement device, a pressure measurement device, a flow measurement device, or a density measurement device, and to communicate with a central server;
   position determination circuitry;
   a data memory; and
   a processor configured to instruct the mobile device to:
      log into the central server,
      receive the identification number from the measurement device, and
      transmit the received identification number to the central server in order to assign the measurement device to the mobile device,
   wherein the communication circuitry is further configured to retrieve fill-level measurement data, pressure measurement data, or flow measurement data of the measurement device from the central server, and
   wherein the processor is further configured to:
      instruct the position determination circuitry to determine a position of the mobile device when a request signal is sent to the measurement device or when the mobile device has received the identification number from the measurement device,
      transmit the determined position of the mobile device together with the identification number to the central server in order to assign the measurement device to the mobile device and to transmit the measurement data of the measurement device to the mobile device, retrieve user account information from the data memory, transmit the user account information and the identification number to the central server in order to assign the measurement device to the mobile device and to transmit the measurement data of the measurement device to the mobile device, and check, when the position of the mobile device is changed, whether the mobile device has received another identification number from another measurement device, and if so, transmit the another identification number to the central server in order to assign the another measurement device to the mobile device and to transmit the measurement data of the another measurement device to the mobile device.

2. The mobile device according to claim 1, wherein the processor is further configured to instruct the mobile device to:

send a request signal to the measurement device, and receive the identification number of the measurement device as a response to the request signal.

3. The mobile device according to claim 1, wherein the communication circuitry is configured to communicate with the measurement device via a radio communication link.

4. The mobile device according to claim 1, further comprising a user interface configured to trigger the processor to transmit the identification number to the central server.

5. The mobile device according to claim 1, further comprising a display apparatus configured to display a measured value that has been acquired by the measurement device, subsequently transmitted to the central server and then, once the identification number has been transmitted to the central server, transmitted from said server to the mobile device.

6. A measuring system for acquiring measured values for fill level, measured values for pressure, or measured values for flow, comprising:

at least one measurement device being a fill level measurement device, a pressure measurement device, or a flow measurement device;

a central server; and a mobile device configured to register the at least one measurement device in the measuring system, the mobile device comprising:

communication circuitry configured to transmit an identification number of the at least one measurement device and to communicate with the central server;

position determination circuitry;

a data memory; and a processor configured to instruct the mobile device to:

log into the central server, receive the identification number from the at least one measurement device, and transmit the received identification number to the central server in order to assign the at least one measurement device to the mobile device, wherein the communication circuitry is further configured to retrieve fill-level measurement data, pressure measurement data, or flow measurement data of the at least one measurement device from the central server, and wherein the processor is further configured to:

instruct the position determination circuitry to determine a position of the mobile device when a request signal is sent to the at least one measurement device or when the mobile device has received the identification number from the at least one measurement device, transmit the determined position of the mobile device together with the identification number to the central server in order to assign the at least one measurement device to the mobile device and to transmit the measurement data of the at least one measurement device to the mobile device, retrieve user account information from the data memory, transmit the user account information and the identification number to the central server in order to assign the at least one measurement device to the mobile device and to transmit the measurement data of the at least one measurement device to the mobile device, and check, when the position of the mobile device is changed, whether the mobile device has received another identification number from another measurement device, and if so, transmit the another identification number to the central server in order to assign the another measurement device to the mobile device and to transmit the measurement data of the another measurement device to the mobile device.

7. The measuring system according to claim 6, wherein the central server is configured to transmit the measured values to the mobile device.

8. The measuring system according to claim 6, wherein the central server is configured to check whether an identification number transmitted from the mobile device relates to a measurement device that is to be assigned to the mobile device, and wherein the central server is further configured to transmit the measured values to the mobile device only if a result of the check is positive.

9. A method for acquiring measurement values for fill level, measurement values for pressure, measurement values for flow, or measurement values for density in a measuring system, and for registering a measurement device in the measuring system, the method comprising:

logging a mobile device into a central server;

transmitting an identification number of the measurement device from the measurement device to the mobile device;

determining a position of the mobile device;

transmitting the determined position of the mobile device together with the identification number to the central server;

assigning the measurement device to the mobile device via the central server based on the determined position and the identification number;

retrieving user account information from a data memory;

transmitting the user account information and the identification number to the central server:

checking, when a position of the mobile device is changed, whether the mobile device has received another identification number from another measurement device, and if so, transmitting the another identification number to the central server and assigning the another measurement device to the mobile device; and transmitting fill-level measurement data, pressure measurement data, or flow measurement data of the measurement device or of the another measurement device from the central server to the mobile device.

10. A nontransitory computer-readable storage medium having stored therein a program, which when executed on a processor of a mobile device, prompts the mobile device to execute a method for acquiring measurement values for fill level, measurement values for pressure, measurement values for flow, or measurement values for density in a measuring system, and for registering a measurement device in the measuring system, the method comprising:

- logging the mobile device into a central server;
- receiving an identification number of the measurement device from the measurement device;
- transmitting the identification number to the central server;
- receiving an assignment of the measurement device to the mobile device via the central server:
- retrieving user account information from a data memory;
- transmitting the user account information to the central server;
- checking, when a position of the mobile device is changed, whether the mobile device has received another identification number from another measurement device, and if so, transmitting the another identification number to the central server and receiving another assignment of the another measurement device to the mobile device via the central server; and
- receiving fill-level measurement data, pressure measurement data, or flow measurement data of the measurement device or of the another measurement device via the central server.

* * * * *